__3,075,020__
__Patented Jan. 22, 1963__

3,075,020
SULFURIZATION OF THIOFORMALS AND MERCAPTALS
Irving D. Webb, Yorba Linda, Calif., assignor, by mesne assignments, to Collier Carbon and Chemical Corporation, a corporation of California
No Drawing. Filed May 19, 1958, Ser. No. 735,995
12 Claims. (Cl. 260—608)

This invention relates to a process for the sulfurization of thioformals and mercaptals, and in particular concerns an improved method for combining elemental sulfur with thioformals or mercaptals to obtain organic products containing a high proportion of chemically bound sulfur.

Organic compounds or products containing relatively large amounts of chemically bound sulfur are widely employed as vulcanization accelerators and in the compounding of extreme pressure lubricants. More recently, certain of such products have been found to be effective fungicides, nematocides and bactericides. One type of such product or compound is that obtained by heating certain thioformals or mercaptals with elemental sulfur under such conditions of time and temperature that the sulfur combines chemically with the thioformal or mercaptal and is not precipitated from the reaction mixture upon cooling the same to a low temperature. Such mode of preparation, however, is not always satisfactory from the standpoint of inducing large amounts of sulfur to combine with the thioformal or mercaptal reactant and/or inducing even moderate amounts of sulfur to react at desirably low temperatures and in short reaction times.

I have now found that in reacting thioformals and mercaptals with elemental sulfur to form products containing increased amounts of chemically combined sulfur, the reaction may advantageously be promoted by carrying it out in the presence of a catalytic amount of a Friedel-Crafts catalyst. The use of such a catalyst in accordance with the invention permits large amounts of sulfur to be readily introduced into thioformals and mercaptals at relatively low temperatures and short reaction times.

As stated, the process of the invention is applicable to the sulfurization of thioformals and mercaptals. Such compounds are characterized by the general formula

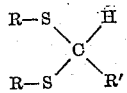

wherein R represents an alkyl, cycloalkyl or aryl radical and R' represents hydrogen or an alkyl, cycloalkyl or aryl radical. When R' represents hydrogen the compounds are known as thioformals. Examples of such compounds include dimethyl thioformal, diethyl thioformal, di-n-hexyl thioformal, di-cetyl thioformal, di-cyclohexyl thioformal, di-dimethylcyclohexyl thioformal, dicycloheptyl thioformal, diphenyl thioformal, di-naphthyl thioformal, di-cresyl thioformal, di-tert. butyl phenyl thioformal, di-xenyl thioformal, etc. When R' represents one of the defined substituents other than hydrogen, the compounds are known as mercaptals, and their nomenclature is based on the aldehydes from which they are derived. Examples of such compounds include dimethylbenzaldehyde mercaptal, di-tert.butyl salicylaldehyde mercaptal, diphenyl butyraldehyde mercaptal, di-isopropyl acetaldehyde mercaptal, di-tetradecyl cyclohexylaldehyde mercaptal, dicyclohexyl propionaldehyde mercaptal, di-phenylnonaldehyde mercaptal, dinaphthyl naphthaldehyde mercaptal, di-p-tert.amyl-phenyl caprylic aldehyde mercaptal, dimethyl o-methyl-benzaldehyde mercaptal, dicetyl benzaldehyde mercaptal, didecyl tetradecyl aldehyde mercaptal, etc. The catalysts which are employed in accordance with the invention are those metal salts of the group commonly referred to as Friedel-Crafts catalysts, e.g., zinc chloride, ferric bromide, stannic chloride, aluminum chloride, mercuric chloride, boron trifluoride, etc. A zinc halide, particularly zinc chloride, is preferred.

The proportions in which the respective reactants are employed depend upon the identity of the same and upon the degree of sulfurization desired. Certain of the thioformals and mercaptals, notably those of relatively low molecular weight, readily combine with as many as 15 atoms of sulfur per molecule of the thioformal or mercaptal, whereas others can be combined, even by the present process, with only about 5 sulfur atoms per molecule. Consequently the reactant proportions may be varied over relatively wide limits, e.g., from as little as about 1 to as much as 15 or more atomic weights of sulfur per molecular weight of the thioformal or mercaptal. Should the latter be one incapable of reacting with all of the sulfur provided, the excess sulfur will deposit out of solution in the reaction product when the latter is cooled (e.g., to about 0° C.) and can readily be removed from the cooled product by filtration. Also, if desired, the sulfur may purposely be employed in excess in order to promote the formation of more highly sulfurized products. The catalyst is of course employed in an amount sufficient to effect a significant increase in the rate of reaction at a given temperature and/or in the number of sulfur atoms introduced into the dialkyl sulfide molecule. Ordinarily, however, between about 0.1 and about 5 parts by weight of the catalyst is provided per 100 parts of the combined weights of the two reactants.

The reaction itself is most readily carried out simply by charging the two reactants and the catalyst to a suitable reaction vessel and thereafter heating the mixture under such conditions of time and temperature that at least one atom of the elemental sulfur combines chemically with each molecule of the thioformal or mercaptal reactant. As will be apparent, the minimum conditions of time and temperature will be governed by the ease with which the thioformal or mercaptal reactant combines with the sulfur and/or the number of sulfur atoms which is desired to be introduced into the thioformal or mercaptal molecule. The maximum conditions are governed by the ease with which the sulfide reactant and/or the sulfurized product are decomposed. Ordinarily, however, the reaction temperature will be between about 100° C. and about 200° C., and the reaction time will be between about 0.5 and about 12 hours. The reaction pressure is usually atmoshperic or the autogenic pressure of the reactants although higher pressures may be employed if desired. Also, if desired, the reaction may be effected in the presence of an inert liquid reaction medium, e.g., benzene, carbon tetrachloride, carbon disulfide, or the like, in order to promote intimate contact between the two reactants and the catalyst.

Upon completion of the reaction, the reaction product is filtered to separate off the catalyst and any unreacted sulfur. Conveniently, a small sample of the reaction product is cooled to about 0° C. to determine if any unreacted sulfur is contained therein. If such is the case the entire reaction product is cooled to about 0° C. prior to filtering; otherwise, it may advantageously be filtered hot. If the reaction has been carried out in the presence of an inert liquid reaction medium, the latter is removed by distillation or by stripping with an inert gas such as nitrogen. In most instances, the present process, like the prior art non-catalytic processes, produces a more or less complex mixture of individual sulfur-containing compounds. If desired, such mixture may be fractionated, usually under high vacuum, to separate individual or groups of individual compounds. However, for substantially all the known technical uses, such fractionation is unnecessary and in some cases may actually be undesirable; accordingly, the present process will not ordinarily include a step of separating the suffurization product into individual compounds.

The following examples will illustrate several applications of the principle of the invention, but are not to be construed as limiting the same. All proportions are given in parts by weight.

*Example I*

A mixture of 108 parts of dimethylthioformal and 256 parts of sulfur is heated at 145°–150° C. for 0.5 hour while passing gaseous boron trifluoride into the liquid mixture. The reaction product is then cooled, diluted with methylene chloride, and filtered. Fractionation of the filtrate yields dimethyltetrathioformal as a heavy oily liquid, $d^{25}=1.37$. Dimethyl hexathioformal is obtained as a yellow viscous liquid, $d^{23}=1.41$, by heating 165 parts of dimethylthioformal with 196 parts of sulfur in the presence of 4 parts of zinc chloride at 120° C. for 1 hour. In the absence of the zinc chloride catalyst, substantially no reaction takes place at 150° C. By suitably increasing the amount of sulfur employed, up to as many as 13 atoms of sulfur can be introduced into the dimethylthioformal molecule at temperatures as low as 150° C., employing zinc chloride as a catalyst.

*Example II*

A mixture of 184 parts of dimethyl benzaldehyde mercaptal, 128 parts of sulfur, and 3 parts of zinc chloride is heated at 120° C. for 1.5 hours, and is then filtered and cooled. No sulfur is precipitated when the product is cooled to −20° C. The product contains an average of about 4 atoms of sulfur per molecule of dimethyl benzaldehyde mercaptal.

*Example III*

A mixture consisting of one mole of diphenyl thioformal, three atomic weights of sulfur and 0.02 moles of anhydrous aluminum chloride is dissolved in an equal volume of carbon tetrachloride, and the solution is heated at about 200° C. for about 5 hours under autogenic pressure. After distilling off the carbon tetrachloride and low-boiling by-products, the sulfurized diphenyl thioformal product is obtained as a dark-colored heavy liquid whose analysis indicates that an average of three atoms of sulfur has been introduced into the diphenyl thioformal molecule.

*Example IV*

A mixture consisting of one mole of di-n-amyl acetaldehyde mercaptal, ten atomic weights of sulfur, and 0.1 mole of mercuric chloride is heated at 150°–170° C. for 4 hours under autogenic pressure. The crude reaction product is then cooled to about 15° C. and filtered to remove a small amount of unreacted sulfur. After gas-stripping with dry nitrogen at 40 mm. pressure and 100° C. the filtrate is obtained as a dark-colored oil whose analysis indicates it to contain an average of 11 atoms of sulfur per molecule.

*Example V*

Example IV is repeated, employing di-cyclohexyl propionaldehyde mercaptal as the mercaptal reactant and anhydrous zinc chloride as the catalyst. A somewhat greater amount of sulfur precipitates when the reaction product is cooled, and the gas-stripped product contains an average of about 9.8 atoms of sulfur per molecule.

*Example VI*

One mole of di-cyclohexyl salicylaldehyde mercaptal, three moles of sulfur and 0.5 mole of zinc bromide are admixed and dispersed in an equal volume of carbon tetrachloride. The liquid mixture is then heated at 120° C. for 8 hours under autogenic pressure. The crude product is transferred to a distillation vessel and distilled at 40 mm. pressure. The bottoms fraction, boiling above 150° C., is then re-distilled to obtain the sulfurized product as an overhead fraction boiling at about 120°–135° C.

*Example VII*

Example VI is repeated, employing diethyl 2,4-dichlorobenzaldehyde mercaptal as the mercaptal reactant, and anhydrous zinc chloride as the catalyst.

*Example VIII*

Example III is repeated, employing dicyclohexyl thioformal as the thioformal reactant, and zinc chloride as the catalyst. Substantially equivalent results are obtained by employing ferric chloride as the catalyst.

Other modes of applying the principle of my invention may be employed instead of those explained, change being made as regards the methods or materials employed, provided the step or steps stated by any of the following claims, or the equivalent of such stated step or steps, be employed.

I, therefore, particularly point out and distinctly claim as my invention:

1. In a process wherein a compound of the formula

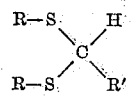

wherein R represents a monovalent substituent selected from the class consisting of alkyl, cycloalkyl, and aryl radicals, and R' represents a monovalent substituent selected from the class consisting of hydrogen and alkyl, cycloalkyl and aryl radicals, is reacted with a molal excess of elemental sulfur under such conditions of time and temperature to add to said compound more than one atom of sulfur per atom of sulfur per atom of combined sulfur in said compound effect the formation of a sulfurized product containing a greater amount of chemically bound sulfur than said compound, the improvement which consists in carrying out said reaction in the presence of a catalytic amount of a Friedel-Crafts catalyst.

2. A process according to claim 1, wherein the said catalyst is a zinc halide.

3. A process according to claim 1 wherein the said compound is a thioformal of the general formula

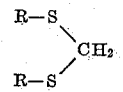

wherein R represents a monovalent substituent selected from the class consisting of alkyl, cycloalkyl, and aryl radicals.

4. A process according to claim 1 wherein the said compound is a mercaptal of the general formula

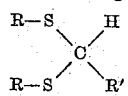

wherein R and R' each represents a monovalent substituent selected from the class consisting of alkyl, cycloalkyl and aryl radicals.

5. The process which comprises heating a compound of the formula

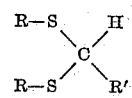

wherein R represents a monovalent substituent selected from the class consisting of alkyl, cycloalkyl and aryl radicals and R' represents a monovalent substituent selected from the class consisting of hydrogen and alkyl, cycloalkyl and aryl radicals, with a molal excess of elemental sulfur in the presence of a catalytic amount of a Friedel-Crafts catalyst and at a temperature between about 100° C. and about 200° C. for a period of time to add to said compound more than one atom of sulfur per atom of combined sulfur in said compound in such manner that the added sulfur fails to precipitate when the reaction product is cooled to a temperature of about 0° C.

6. The process of claim 5 wherein the said catalyst is a zinc halide.

7. The process of claim 5 wherein the said compound is a thioformal of the general formula

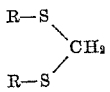

wherein R represent a monovalent substituent selected from the class consisting of alkyl, cycloalkyl and aryl radicals.

8. The process of claim 5 wherein the said compound is a mercaptal of the general formula

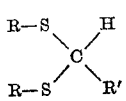

wherein R and R' each represents a monovalent substituent selected from the class consisting of alkyl, cycloalkyl, and aryl radicals.

9. The process of claim 5 wherein the said heating is effected under autogenic pressure.

10. The process of claim 5 wherein greater than 1 and less than about 15 atomic weights of sulfur are provided per molecular weight of said compound.

11. The process of claim 7 wherein the said catalyst is anhydrous zinc chloride.

12. The process of claim 8 wherein the said catalyst is anhydrous zince chloride.

References Cited in the file of this patent

UNITED STATES PATENTS 2,841,518  Webb et al. _____ July 1, 1958
2,882,197  Webb et al. _____ Apr. 14, 1959

OTHER REFERENCES

C. A. Thomas: Anhydrous Aluminum Chloride in Organic Chemistry, A. C. S. Monograph Series No. 87, p. 164 (1941), Reinhold Pub. Co., New York, N.Y.
Boesken: Chem. Abs. 5, 3399 (1911).
Holmberg: Liebig's Annalen 359, 81–99 (1908).
Kraft et al.: Ber. Deut. Chem. 29, 435–436 (1896).

UNITED STATES PATENT OFFICE
CERTIFICATE OF CORRECTION

Patent No. 3,075,020                         January 22, 1963

Irving D. Webb

It is hereby certified that error appears in the above numbered patent requiring correction and that the said Letters Patent should read as corrected below.

Column 4, line 38, strike out "of sulfur per atom", second occurrence; line 39, after "compound" insert -- and thereby --.

Signed and sealed this 3rd day of September 1963.

(SEAL)
Attest:

ERNEST W. SWIDER
Attesting Officer

DAVID L. LADD
Commissioner of Patents